Patented Mar. 27, 1928.

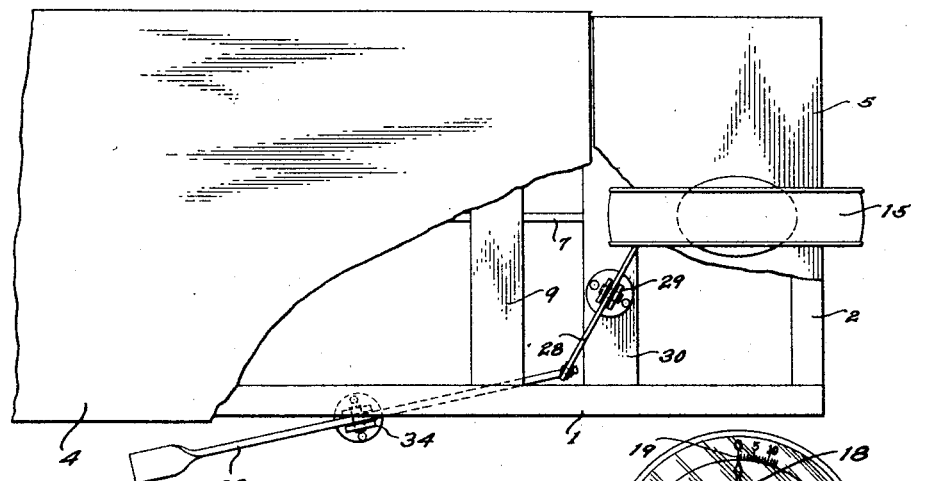
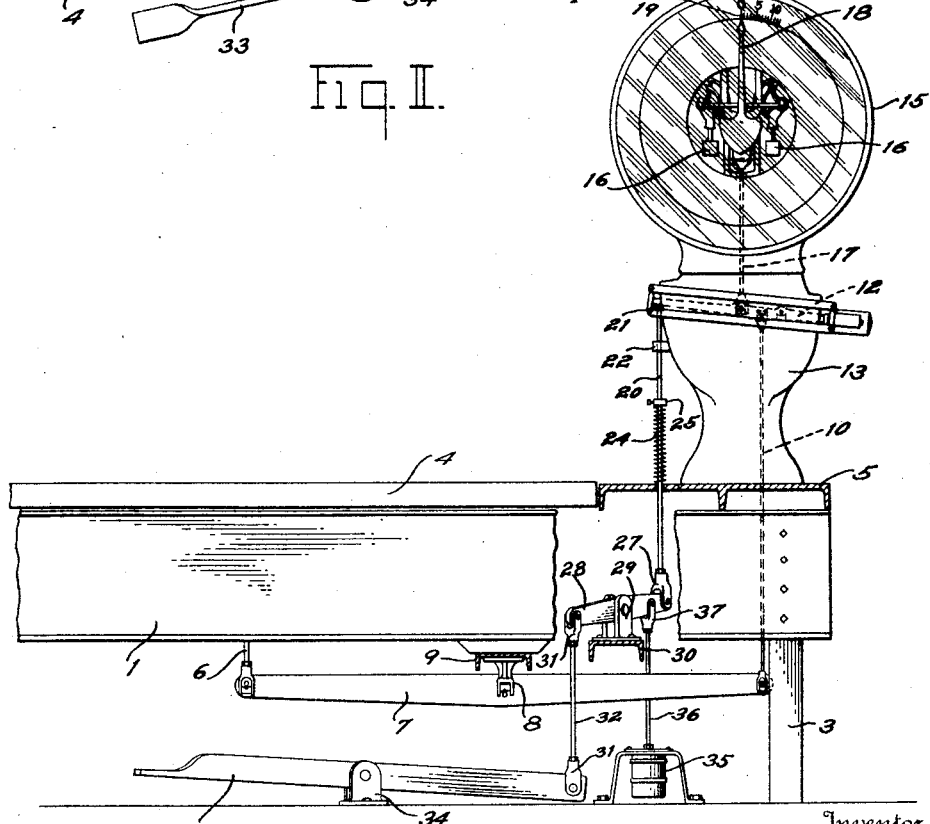

1,663,985

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed January 24, 1927. Serial No. 163,031.

This invention relates to weighing scales, and particularly to scales which are used for weighing comparatively heavy loads and which are likely to be subjected to severe shocks, and one of the principal objects is the provision of means for protecting the delicate automatic weighing mechanism from such shocks, thus avoiding unnecessary wear and injury to the mechanism.
In the manufacture of sheet iron and steel it is a usual practice to cut the material into sheets from 2 to 3 ft. in width and from 8 to 10 ft. in length. In order to facilitate shipping and to eliminate unnecessary handling, sheets of substantially uniform size and gage are packed in bundles and bound with strap iron while the sheets are piled upon the scale platform. Another object is the provision of means for locking the weighing mechanism against movement during packing and bundling operations but which may be readily and easily released when a weighing is desired.

A further object is the provision of locking mechanism for scales which is provided with simple means for retarding the action of the locking mechanism so that the engagement of the latter with the weighing mechanism will not transmit serious shocks thereto.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a fragmentary side elevational view of the scale incorporating my invention, parts being broken away;

Figure II is a fragmentary top plan view of the scale, certain parts being broken away.

I have shown the device of my invention as used in connection with a scale adapted for use in bundling sheet iron and steel, but it is to be understood that the invention is not limited to the particular use shown, but may be employed in other scales, and that I contemplate its use wherever applicable.

The stationary supporting frame of the scale is constructed of rolled commercial steel stock and comprises channel side and end members 1 and 2 suitably secured together and supported upon angle metal legs 3. The side channel members 1 serve to house and support lever mechanism (not shown) suitably supporting a load-receiving platform 4. The platform lever mechanism is connected by means of a link 6 to a lever 7 suitably fulcrumed upon a bracket 8 secured to a transversely extending channel member 9. The other end of the lever 7 is connected by means of a link 10 to a lever 12 suitably fulcrumed within an upright housing 13 erected upon a deck 5 joining the side channel members 1. Surmounting the housing 13 is a watch-case-shaped casing 15 which houses and supports the load-counterbalancing and indicating mechanism. The load-counter-balancing mechanism consists substantially of a pair of pendulums 16 connected by means of a link 17 to the lever 12, and are adapted to move outwardly and upwardly to counterbalance the load upon the platform, the pendulum mechanism being connected by means of rack and pinion mechanism to an indicator hand 18 which co-operates with the chart 19 to indicate the weight of the load.

In the operation of the mechanism a load placed upon the platform 4 acts upon the platform levers (not shown) and exerts an upward pull upon the link 6 which is transmitted to the link 10 exerting a downward pull thereon and causing movement of the lever 12 and the pendulums 16 to counterbalance the load.

It will be apparent to anyone skilled in the art that the impact or shock of a load thrown upon the platform 4, as is sometimes done by inexperienced or careless workmen, is injurious to the delicate load-counterbalancing and indicating mechanism of the scale. It is also obvious that if movement of the lever 12 is restrained or prevented the impact of the load cannot be transmitted to the pendulum mechanism. Locking means is, therefore, provided consisting of a vertically movable rod 20 provided with a head 21 adapted to engage one extremity of the lever 12, the rod being held in proper relative position by means of a guide 22 forming an integral part of the column 13. The rod 20 is held in resilient engagement with the lever 12 by means of an expansive spring 24 interposed between the deck 5 and an adjustable collar 25 secured by means of a set screw to the rod 20. The lower end of the rod 20 is connected by means of a yoke

27 to one end of an arm or lever 28 suitably fulcrumed upon a bracket 29 fixed to a channel member 30. The opposite end of the arm 28 is connected through the medium of yokes 31 and a link 32 to one end of a treadle 33, the latter being pivoted to a floor bracket 34.

It will be obvious from the foregoing description that the locking rod 20 is normally held in engagement with the lever 12 by means of the spring 24. Thus, whenever a load is placed upon the platform 4 it will have no effect upon the platform lever and load-counterbalancing and indicating mechanisms as long as the lever 12 is locked by the rod 20. In order to release the weighing mechanism it is only necessary to depress the foot treadle 33, this movement operating to withdraw the locking rod 20 from engagement with the lever 12. The weighing mechanism is then free to function as it would normally do if it were not locked by the rod 20. The weighing mechanism is free to operate as long as the treadle 33 is depressed, and a release of the treadle causes the rod 20 to again engage the lever 12 under the influence of the spring 24.

If the treadle is depressed or released too rapidly the reaction of releasing or locking the weighing mechanism would be very rapid and might result in injury to the weighing mechanism. I have, therefore, provided a dash pot to overcome this difficulty, the plunger operating in the dash pot being connected by means of a rod 36 and yoke 37 to the pivoted arm 28 and serving to retard the movement of the arm and associated mechanism.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism including a lever, and locking means for said lever including a dash pot.

2. In a device of the class described, in combination, weighing mechanism, locking means for said weighing mechanism, operating means for said locking means, and means including a dash-pot for retarding the action of said locking means.

3. In a device of the class described, in combination, weighing mechanism including a lever, a locking member for said lever, resilient means for normally retaining the locking member in engagement with said lever, means including a treadle for releasing said locking member, and means including a dash pot for retarding the action of said locking member.

4. In a device of the class described, in combination, weighing mechanism, locking mechanism for said weighing mechanism, a treadle, an intermediate lever connecting said treadle with said locking mechanism, and means comprising a dash pot for retarding the operation of said locking mechanism.

5. In a device of the class described, in combination, weighing mechanism including a lever, locking means for said lever, and means comprising a dash pot for retarding the action of said locking means.

6. In a device of the class described, in combination, automatic weighing mechanism including a lever, a locking rod for said lever, a spring for normally holding said rod in engagement with said lever, and foot depressed means for disengaging the locking rod from said lever.

HALVOR O. HEM.